United States Patent
Chaudhury et al.

(10) Patent No.: US 7,817,871 B2
(45) Date of Patent: Oct. 19, 2010

(54) SCALING OF RASTER IMAGES WITHOUT BLURRING OF EDGES

(75) Inventors: Krish Chaudhury, Milpitas, CA (US); Dejan Markovic, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1018 days.

(21) Appl. No.: 10/921,628

(22) Filed: Aug. 18, 2004

(65) Prior Publication Data

US 2006/0039623 A1 Feb. 23, 2006

(51) Int. Cl.
- *G06K 9/42* (2006.01)
- *G06K 9/44* (2006.01)
- *G06K 9/40* (2006.01)
- *G06K 9/32* (2006.01)

(52) U.S. Cl. .................. 382/266; 382/256; 382/298; 382/264; 382/263; 382/300

(58) Field of Classification Search .............. 382/264, 382/300, 263, 266, 256, 298
See application file for complete search history.

(56) References Cited

U.S. PATENT DOCUMENTS

| | | | | |
|---|---|---|---|---|
| 4,958,272 A | * | 9/1990 | Wake | 345/597 |
| 5,054,100 A | * | 10/1991 | Tai | 382/300 |
| 5,613,048 A | * | 3/1997 | Chen et al. | 345/419 |
| 5,818,971 A | * | 10/1998 | Moolenaar et al. | 382/252 |
| 6,271,861 B1 | * | 8/2001 | Sargent et al. | 345/589 |
| 6,313,840 B1 | * | 11/2001 | Bilodeau et al. | 345/423 |
| 6,714,688 B1 | * | 3/2004 | Gallagher et al. | 382/266 |
| 6,717,697 B1 | * | 4/2004 | Oosawa | 358/1.9 |
| 6,721,453 B1 | * | 4/2004 | Benson et al. | 382/199 |
| 6,766,068 B2 | * | 7/2004 | Aoyama et al. | 382/300 |
| 6,917,721 B2 | * | 7/2005 | Elad et al. | 382/300 |
| 7,016,539 B1 | * | 3/2006 | Silver et al. | 382/216 |
| 7,054,507 B1 | * | 5/2006 | Bradley et al. | 382/300 |
| 7,324,669 B2 | * | 1/2008 | Nakanishi et al. | 382/118 |
| 7,426,312 B2 | * | 9/2008 | Dance et al. | 382/254 |
| 7,437,018 B1 | * | 10/2008 | Amirghodsi | 382/293 |
| 7,558,417 B2 | * | 7/2009 | Knoplioch et al. | 382/131 |
| 7,697,742 B2 | * | 4/2010 | Dehmeshki | 382/131 |
| 7,702,179 B2 | * | 4/2010 | Ting | 382/275 |
| 2003/0020710 A1 | * | 1/2003 | Biermann et al. | 345/420 |

OTHER PUBLICATIONS

Sarvajit S. Sinha et al., "A Two-Stage Algorithm for Discontinuity-Preserving Surface Reconstruction," pp. 36-55, IEEE Transactions on Pattern Analysis and Machine Intelligence, vol. 14, No. 1, Jan. 1992.

Salisbury, et al., "Scale-Dependent Reproduction of Pen-and-Ink Illustrations," pp. 461-468, International Conference on Computer Graphics and Interactive Techniques, ACM Press, 1996.

Unser, Michael, "Splines: A Perfect Fit for Signal/Image Processing," pp. 22-38, IEEE Signal Processing Magazine, Nov. 1999.

* cited by examiner

*Primary Examiner*—Vikkram Bali
*Assistant Examiner*—Michelle Entezari
(74) *Attorney, Agent, or Firm*—Fish & Richardson P.C.

(57) ABSTRACT

Edges are detected in a raster image and generate parametric curves from the detected edges. The parametric curves are used to render a scaled version of the raster image. Some embodiments may allow edge locations within a raster image to retain a satisfactory level of sharpness when the raster image is scaled to a larger size.

45 Claims, 5 Drawing Sheets

SCALING OF RASTER IMAGES WITHOUT BLURRING OF EDGES

BACKGROUND

The present invention relates to digital imaging.

An image can be modeled as a piecewise continuous two dimensional function representing color values over a rectangular plane (the image plane). A raster image (suitable for storage/retrieval processing in digital computers) is a discrete two dimensional array of image color values. A raster image can be obtained by sampling a continuous image function over a regular grid spanning the image plane. Image resampling is the process of mapping one raster image to another, corresponding to the same underlying image, but defined over a different sampling grid. Image magnification (also referred to as image supersampling) is a special case of image resampling. In this case, an input raster image is mapped to another raster image (corresponding to the same underlying image) on a denser sampling grid of larger size. Using conventional methods, magnification of raster images typically leads to edge blurring, a phenomenon whereby sharp changes of color in the original raster image get replaced by gradual color variation in the output raster image. Since, in a typical image, edges demarcate visually meaningful segments of the image, edge blurring degrades the visual quality of the image.

In a typical digital imaging system, any original underlying piecewise continuous image function is lost, the raster image is all that is remembered. Consequently, during resampling, when it is necessary to generate color values at locations other than original sampled points, some estimating technique is needed. Such techniques implicitly or explicit solve the problem of image reconstruction, whereby they make a local or global estimation of the lost continuous image function which can then be resampled as desired.

Assuming an original continuous image was sampled at rate satisfying the Nyquist criterion, it is possible, in theory, to have an ideal reconstruction filter. The ideal reconstruction filter is shaped like a box in the frequency domain (equivalently, it is the sinc function in spatial domain). The width of the box is determined by $f_{Nyquist}=2f_{max}$, where $f_{max}$ is the largest spatial frequency component in the image. Unfortunately, in typical cases, $f_{max}$ is not known a priori. An ideal reconstruction filter is also undesirable from a performance point of view, because the sinc function converges very slowly with its magnitude going down very slowly over time (Gibbs phenomenon).

In the absence of the ideal reconstruction filter, most image reconstruction and resampling techniques fall back to reconstruction filters whose characteristics are similar to the ideal one. Among nonideal reconstruction filters, interpolators enjoy popularity for performance and simplicity reasons. Interpolation is the process of determining the values of a discrete function at points lying in between samples. This is achieved by fitting a continuous function through the discrete input samples (note the implicit regularization assumption that the unknown function is continuous in between samples—this directly leads to edge blurring). From a signal processing point of view, interpolation is equivalent to applying a low-pass FIR (Finite Impulse Response) filter whose characteristics resemble (to varying extents) those of the ideal reconstruction filter. Local interpolation techniques do not enforce any global smoothness measure. A local polynomial surface patch is fitted to the immediate neighborhood of the point in question without any attempt to ensure inter-patch continuity.

SUMMARY

In one aspect, the invention features a method, system, and computer program product. A parameterized surface interpolating an input raster image is defined. Image edge locations in the surface parameter space are received. The image edge locations are used to reparameterize the surface such that the shape of the surface is altered near edge locations so as to preserve edge sharpness.

In another aspect, the invention features a method. The method includes means for defining a parameterized surface interpolating an input raster image. The method further includes a means for receiving image edge locations in the surface parameter space, and a means for using the image edge locations to reparameterize the surface such that the shape of the surface is altered near edge locations so as to preserve edge sharpness.

Implementations may include one or more of the following features. The surface definition may satisfy the equation Color=$Z(x, y)$, where Color is the color at point $(x, y)$. $g_x(x, y, E)$ and $g_y(x, y, E)$ may be reparameterization functions, E being edge information. After reparameterization, the color at a point $(x, y)$ may be calculated to satisfy the equations $x'=x+g_x(x, y, E)$, $y'=y+g_y(x, y, E)$, and Color=$Z(x', y')$. The image edge locations may be received with the raster image. The image edge locations may be detected in the input raster image.

In another aspect, the invention features a method, system, and computer program product. An input raster image of input pixels $(x, y)$ is received, each input pixel having a color value. A parametric surface interpolating the color values of the input raster image is defined. Edges are detected on the input raster image. An edge enhancement mapping is created by estimating edge locations on the surface parameter space, such that the edge enhancement mapping is a non linear mapping from image plane to surface parameter space that does not map image plane points to points close to estimated edge locations on the surface parameter space.

In another aspect, the invention features a method. The method includes means for receiving an input raster image of input pixels $(x, y)$, where each input pixel having a color value. The method further includes a means for defining a parametric surface interpolating the color values of the input raster image, and a means for detecting edges on the input raster image. The method further includes a means for creating an edge enhancement mapping by estimating edge locations on the surface parameter space, such that the edge enhancement mapping is a non linear mapping from image plane to surface parameter space that does not map image plane points to points close to estimated edge locations on the surface parameter space.

Implementations may include one or more of the following features. The parametric surface may be defined as a smooth function $Z(x, y)$ over a parameter plane. The parameter plane may be the domain of parameters $(x, y)$ and generally corresponds to the image plane. At a value of $(x, y)$ corresponding to an input pixel locations, the function $Z(x, y)$ may evaluate to the color value of the input pixel. The nature of the correspondence between the image plane and parameter plane may be modified by the edge enhancement mapping. The edge enhancement mapping may be defined by scaling factors $s_x$ and $s_y$, and an edge enhancement function g according to the following equations for an output pixel at indices $(p, q)$: $x_s=p/s_x$ and $y_s=q/s_y$ which map the output pixels to points on the input raster image, and $x'=x_s+g_x(x, y, E)$ and $y'=y_s+g_y(x, y, E)$ which maps the image plane to the parameter plane using the edge enhancement functions $g_x$ and $g_y$, the functions $g_x$ and $g_y$ having values close to zero when their arguments are far from an edge location and having absolute values close to one when their arguments are close to an edge location. The color of the pixel at image plane location (x, y) may be the value of Z(x', y').

The scaling factor $s_x$ may be equal to the scaling factor $s_y$. The parametric surface may be a cubic B-spline surface and the parameter plane is a spline parameter plane. The function g may be approximately $g_x = 2\sigma_x(x-x_e)/(\sigma_x^2(x-x_e)^2+1)$ and $g_y = 2\sigma_y(y-y_e)/(\sigma_y^2(y-y_e)^2+1)$, where $x_e$ and $y_e$ are position coordinates of the edge pixel closest to the pixel (x, y), and where $\sigma_x$ and $\sigma_y$ are sharpness parameters such that a larger value of $\sigma_x$ or $\sigma_y$ indicates a higher level of sharpness at the edge positions. The values $\sigma_x$ and $\sigma y$ may be equal to $s_x$ and $s_y$, respectively. The function g may be altered at regions where more than one edge positions are present. Instructions to estimate edge positions may comprise instructions to apply a Canny edge detector to the input raster image and to apply edge thinning to every edge found by the edge detector. The output raster may be the same as the input raster image. The edge enhancement mapping may be performed using an edge enhancement function g, where the edge enhancement function g is implemented by the following approximation: $g_x=2(x-x_e)/((x-x_e)^2+1)$ and $g_y=2(y-y_e)/((y-y_e)^2+1)$. $x_e$ and $y_e$ may be position coordinates of the edge pixel closest to the pixel (x, y).

In another aspect, the invention features a method, system, and computer program product. Edges in a raster image are detected, and parametric curves are generated from the detected edges. The parametric curves are used to render a scaled version of the raster image.

In another aspect, the invention features a method. The method includes means for detecting edges in a raster image, and means for generating parametric curves from the detected image. The method further includes means for using the parametric curves to render a scaled version of the raster image.

These general and specific aspects may be implemented using a system, a method, or a computer program, or any combination of systems, methods, and computer programs.

The invention can be implemented to realize one or more of the following advantages. Edge locations within a raster image retain a satisfactory level of sharpness when the raster image is scaled to a larger size. Edge locations can be sharpened without changing the size of the original raster image. The use of a cubic B-spline formulation guarantees global $C^2$ continuity at regions not including any detected edge.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A raster image is made up of a finite number of discrete pixels. Therefore, it is difficult to scale up a raster image without losing some of the image quality. When an image is scaled to a larger size, new pixels are created, and color values must be assigned to these new pixels, which is typically done through some sort of interpolation method.

An edge is a location of a sharp change of color within an image. Typically, edges demarcate visually meaningful segments of an image. Therefore, it is important to retain a sharp change of color along edge locations during the scaling process, while keeping color variations at non edge portions of the image as smooth as possible. This is achieved by applying an interpolating surface that retains a uniform smoothness across most of the image, while introducing creases in the interpolating surface along estimated edge curves.

Figure 1:
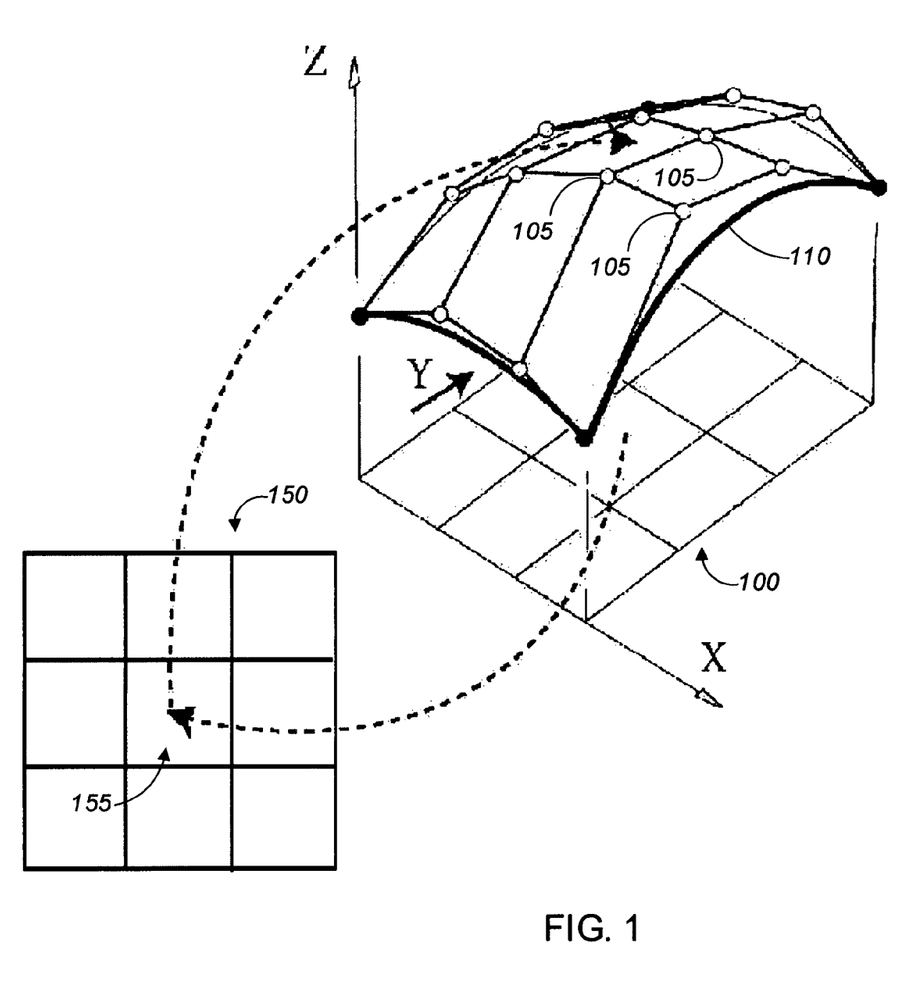
FIG. 1 shows an image plane 100 and an associated spline parameter plane 150.

In FIG. 1, a graphical representation of an image plane 100 is presented. The input raster image on the image plane 100 comprises of a set of pixels. Each pixel is represented by a point whose position (x, y) corresponds to a point in the grid defined on the image plane 100. The z coordinate of the point representing the pixel is equal to the color value of the pixel. A cubic B-spline interpolating surface, 110, is a $C^2$ continuous surface passing through all the points representing pixels in the input raster image. This surface can be viewed as an estimation of the underlying image function.

The B-spline interpolating surface 10 is defined in terms of a set of control points 105. Although the control points may be very close to the surface, they are not on the surface. Rather, the convex hull of the set of control points contains the interpolating surface.

In FIG. 1, only one color value is represented along the Z axis. For a grayscale image, only one color component value need be defined for each image, and the one color value would represent the gray value for each individual pixel, ranging from solid white to solid black. For a color image, multiple color component values will likely be defined, each color component value having its own value along the Z coordinate. For example, color images may be represented in the RGB color space, each pixel having three color values of red, green and blue. Color images may be represented in other color spaces, e.g., the CMYK color space, having four color component values of cyan, magenta, yellow, and black. Accordingly, the dimension of the Z vector is the same as the number of color values.

One implementation will now be described using the following mathematical notation for convenience. $\Omega=\{(x, y)|0 \leq x \leq M, 0 \leq y \leq N\}$ denotes the rectangular image plane. Without loss of generality, the input raster image is considered to be a set of samples taken at integer values of x and y. $G=\{(x, y)|x \in [0, 1, \ldots M], y \in [0, 1, \ldots N]\}$ denotes the sampling grid on the image plane. $\{Z_{ij}|(i, j) \in G\}$ denotes the set of sample color values over the grid, so that each element of the vector $Z_{ij}$ corresponds to one color plane or color component. For example, for an RGB image, the vector $Z_{ij}$ has three components corresponding to red, green, and blue planes respectively. For a CMYK image, the vector $Z_{ij}$ has four components corresponding to cyan, magenta, yellow, and black planes respectively.

Figure 4:
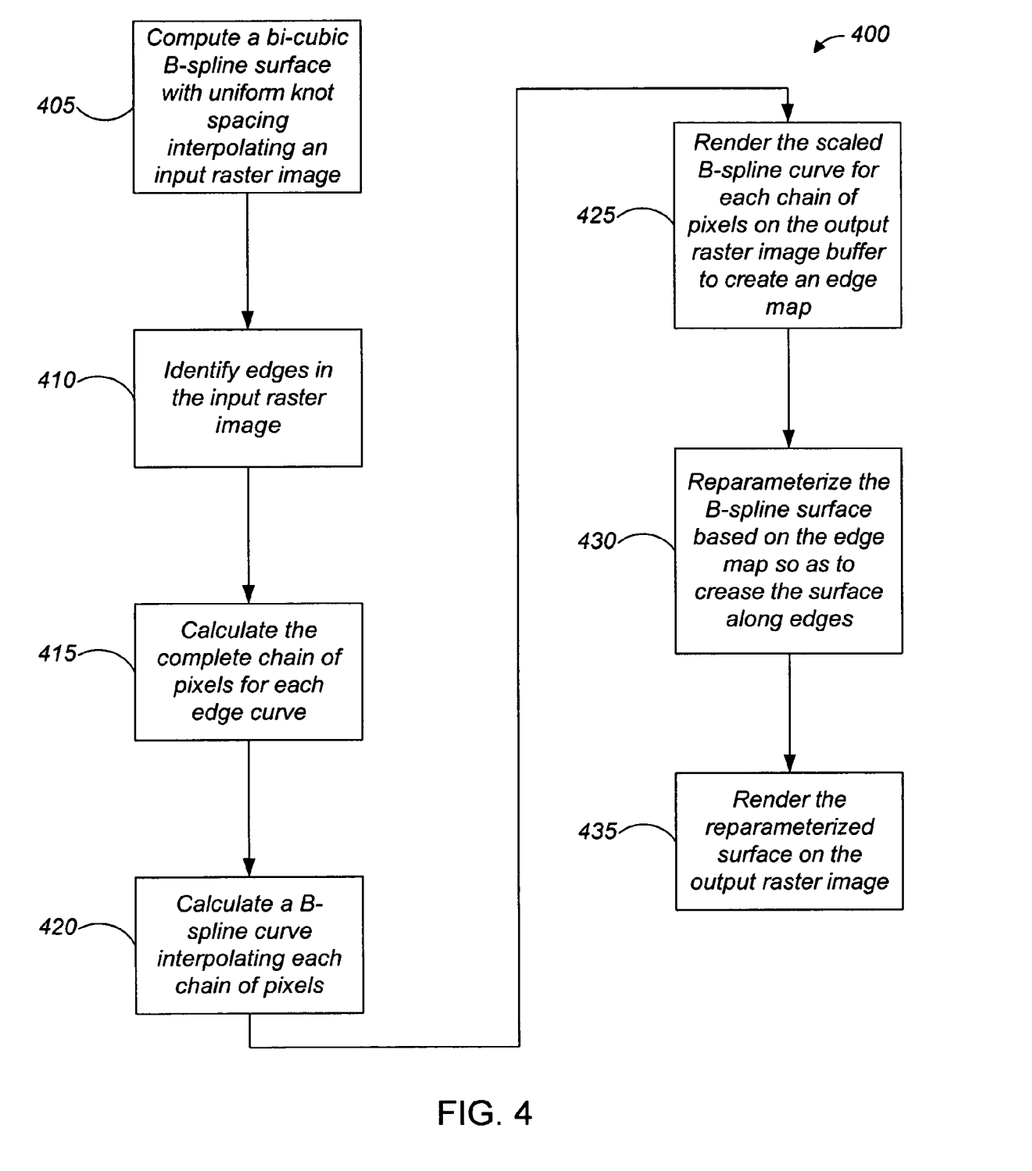
FIG. 4 shows a flow chart illustrating how to scale raster images.

FIG. 4 shows a method 400 for scaling input raster images while minimizing edge blurring. A conventional two dimensional cubic B-spline surface with uniform knot spacing that interpolates the input raster image is computed (step 405). Each control point of this interpolating surface is a vector, where the dimension of the vector is the same as the number of color planes. The two dimensional matrix of control points is denoted by $C_{m,n}$, where $m \in [0, 1, \ldots (M+2)]$, $n \in [0, 1, \ldots (N+2)]$.

The conventional two dimensional cubic B-spline interpolating surface may be defined as $$\vec{Z}(x, y) = \sum_{k=0}^{3} \sum_{l=0}^{3} B_k(s) B_l(t) \vec{C}_{i+k, j+l} \quad (1)$$

where $i = \lfloor x \rfloor$, $j = \lfloor y \rfloor$, $s = x - i$ and $t = y - j$. The control points are computed for each color component independently, so that the surface passes through all of the sampled points, e.g., $Z(i, j) = Z_{ij} \forall (i, j) \in G$, where G denotes the sampling grid on the image plane.

In this instance, $$B_0(t) = \frac{(1-t)^3}{6} \quad (2)$$

$$B_1(t) = \frac{(3t^3 - 6t^2 + 4)}{6}$$

$$B_2(t) = \frac{(-3t^3 + 3t^2 + 3t + 1)}{6}$$

$$B_3(t) = \frac{t^3}{6}$$

where $0 \le t < 1$.

The cubic B-spline interpolating surface is a patchwise bicubic function. Each patch is a map of an unit rectangle $\{(i, j) \times (i+1, j+1)\} \in \Omega$ for any $(i, j) \in G$ and can be expressed as $$\sum_{k=0}^{3} \sum_{l=0}^{3} B_k(s) B_l(t) \vec{C}_{i+k, j+l},$$

with fixed i and j, and s and t varying between 0 and 1. Control points are shared between neighboring patches. Intra-patch $C^2$ continuity is guaranteed by the cubic nature of the functions.

Inter-patch $C^2$ continuity is guaranteed by the sharing of control points between patches. Together, these traits ensure that the B-spline formulation possesses global $C^2$ continuity. Therefore, the B-spline interpolation is a good estimation of the original raster image at non-edge locations, where maximal smoothness is desired. In an alternative implementation, instead of cubic B-splines as shown above, any other parameterized globally smooth interpolating surface may also be used.

Edges in the input raster image are identified (step 410). $E(x, y) | (x, y) \in \Omega$ denotes an estimated image edge map, where $$E(x, y) = \begin{cases} 1 & \text{if } (x, y) \text{ is on an estimated edge curve} \\ 0 & \text{otherwise} \end{cases}$$

$E(x, y)$ can be computed by running any edge detection process on the input image followed by an edge thinning process. A Canny edge detector can be used as the edge detection process and a simple 8-neighbor based edge thinner can be used as the edge thinning process.

A contiguous chain of pixels is calculated for each edge curve (step 415). A B-spline curve is calculated interpolating each chain of pixels (step 420). The collection of these curves together represent the edge map, the edge locations on the parameter space of the surface interpolating the input raster image. The computed B-spline curve for each chain of pixels is scaled with the specified scale factor for the image, and the scaled B-spline curve is rendered on the output raster image buffer (step 425). This provides an approximation of the edge map at the desired scale.

A scaled up raster image is a super sampled version of the input raster image. In the scaled raster image, pixels exist not only at the original grid locations, G, but also in between them. In order to render this up-sampled image, color values at locations with fractional (x, y) coordinate values must be determined. This necessitates the estimation of the underlying continuous image function that was lost during the original digitization of the image. The cubic B-spline interpolation surface described above is such an estimated function, providing a globally smooth ($C^2$ continuous) color field over the output raster. While smoothness is desirable in most regions of the image, it is undesirable across edges. Typical interpolation techniques (including the conventional bicubic B-spline interpolation) ignore this. However, the bicubic B-spline interpolation is desirable among image interpolation technique, as it provides global C2 continuity, while most interpolation techniques only offer local continuity. This provides extra smoothness, which results in visually more pleasing results everywhere except near edges.

In order to preserve edge sharpness, a reparameterized variant of the standard cubic B-spline interpolating surface is introduced, which preserves edge sharpness by introducing creases along identified edge curves (step 430). It maintains the $C^2$ continuity characteristic of standard B-splines at non-edge locations. The reparameterized variant can be expressed as $Z(x', y')$ where $x' = x + g_x(x, y, E)$ and $y' = y + g_y(x, y, E)$, and where the function $Z(x, y)$ is as defined above and $g(x, y, E)$ is a reparameterizing function. In one implementation, the reparameterizing function is defined as $$g_x(x, y, E) = \frac{2\sigma_x(x - x_e(x, y, E))}{\sigma_x^2(x - x_e(x, y, E))^2 + 1} \quad (3)$$

where $\sigma_x$ is a parameter of the method; the larger $\sigma_x$ is, the sharper the edges of the rendered surface. In one implementation, $\sigma_x$ is equal to the scale factor $s_x$. Also, $x_e(x, y, E)$ denotes the nearest edge point to (x, y) at the same y. Therefore, $\forall (x', y)$ satisfying $E(x', y) = 1$ we have dist$((x, y), (x_e(x, y, E), y)) < $ dist$((x, y), (x', y))$. The functions $g_y(x, y, E)$ and $y_e(x, y, E)$ are symmetrically defined.

In one implementation, a slightly different function $g_x(x, y, E)$ and $g_y(x, y, E)$ is applied at points where more than one edge interact. When two or more edge curves interact at a specific location, care must be taken to retain the distinctness of all edges in the output raster image. Each edge curve has its own edge transition region, a region that surrounds the edge curve. The size of the edge transition region is dependent on the input raster image, but is typically in the range of one to two pixels wide. In other words, the edge transition region extends one-half to one pixel away from the edge curve in all directions. Two edge curves would interact if the edge transition region of one edge curve overlaps the edge transition region of the second edge curve.

If this happens, and multiple distinct edges are not maintained in the areas of interaction, the output raster may contain artifacts, spurious and undesirable features that are not present in the input raster, as well as inaccurately represent the image edges in the areas of interaction. Therefore, a slightly modified reparameterization function is applied in these circumstances to ensure that the areas of edge interaction are accurately represented in the output raster image.

The reparameterized surface Z(x', y') is rendered on the output raster image (step 435). In one implementation, for every pixel at indices (p, q) on the output raster image, the reparameterized B-spline parameters are computed from the appropriate scale factor; for example, $$x' = \frac{p}{s_x} + g_x(x, y, E) \text{ and } y' = \frac{q}{s_y} + g_y(x, y, E),$$

where $g_x(x, y, E)$ and $g_y(x, y, E)$ are calculated using equation (3) above. The B-spline color value is evaluated at every point (p, q). The output pixel at indices (p, q) on the output raster image is painted with the calculated color value.

Figure 2A:
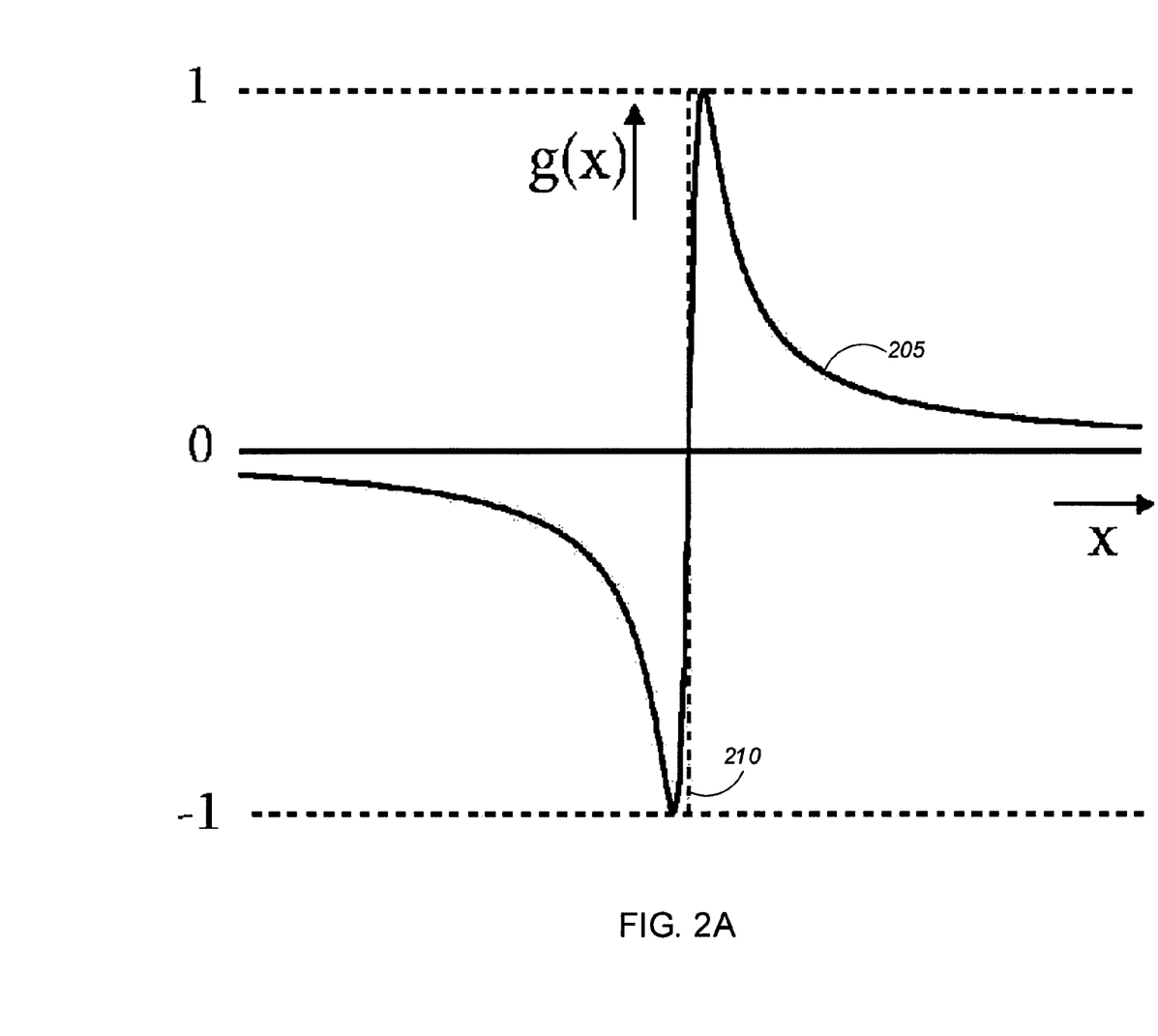
FIG. 2A shows a reparameterizing function.

FIG. 2A shows a one dimensional analog of the reparameterization function (3) indicated above, with the origin translated to $x_e$. The value of the reparameterization function g(x) 205 asymptotically approaches zero as distance from $x_e$, the edge point 210, becomes larger. As it starts approaching the edge region from the left, it starts decreasing, going all the way down to −1 at $$x = x_e - \frac{1}{\sigma_x}.$$

From there it increases very rapidly to +1 at $$x = x_e + \frac{1}{\sigma_x}.$$

From +1 it drops down again asymptotically approaching zero as distance from $x_e$ and the edge region increases. The sharpness of the edges in output can be adjusted by tuning the parameter σ. Any function that displays approximately similar characteristics to those described above may be used as a suitable reparameterization function.

Figure 2B:
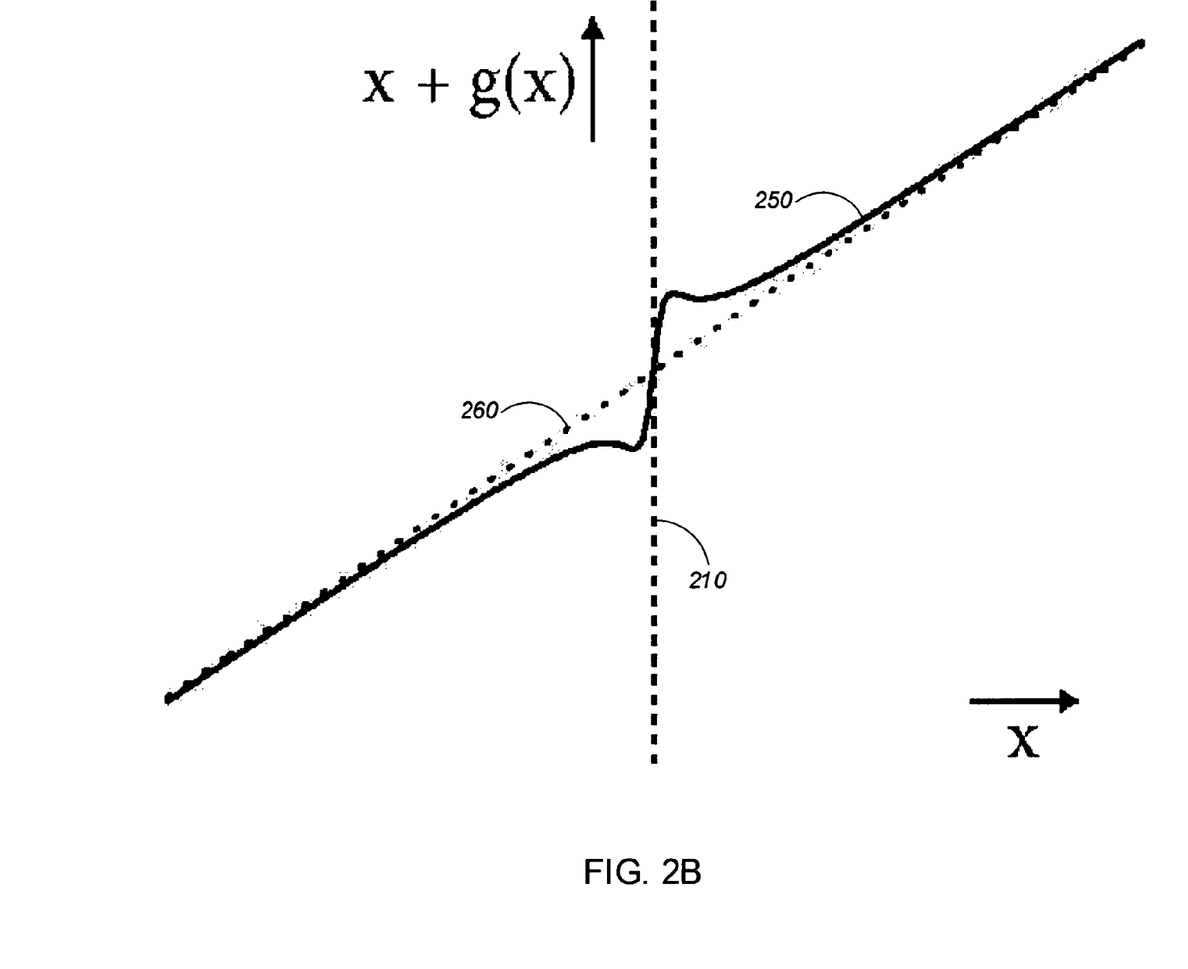
FIG. 2B shows a reparameterizing function added to a typical linear dependency on the position.

FIG. 2B shows a one dimensional representation of the function x+$g_x$(x, y, E), curve 250, with the origin translated to $x_e$, the edge point 210. x+$g_x$(x, y, E) and y+$g_y$(x, y, E) replace x 260 and y as B-spline parameters in equation (1) above. In other words, the function Z(x', y'), which adds creases to the interpolation function along edge curves, is rendered for the output raster image instead of Z(x, y), where the function Z(x, y) is defined in equation (1).

Figure 3:
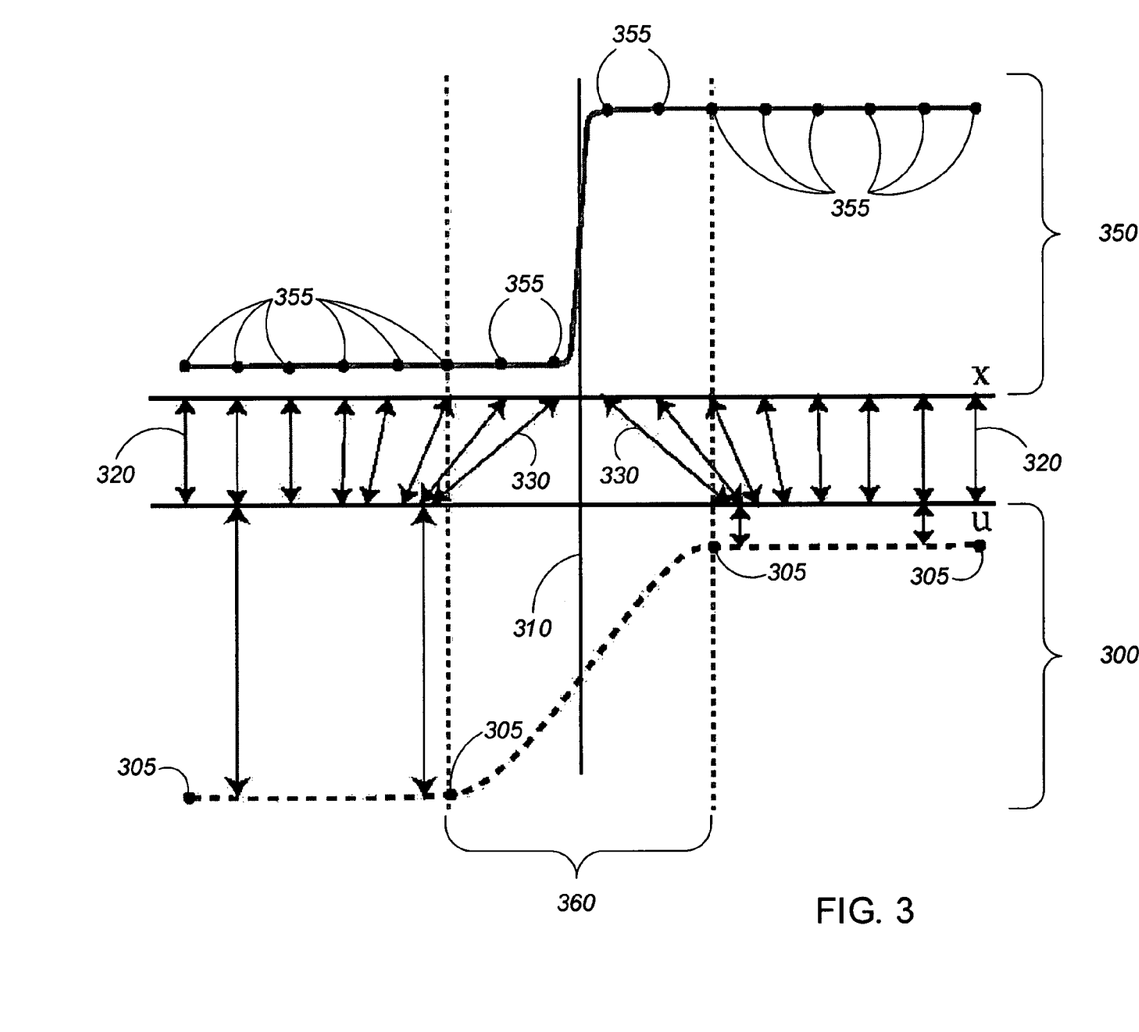
FIG. 3 shows a B-spline curve 300 and the same B-spline curve with edge enhancement 350.

FIG. 3 illustrates how reparameterization of the B-spline function sharpens edges, with a one dimensional analogy. Pixels 305 are used to generate the conventional B-spline curve 300 as shown. The ordinary B-spline function results in a smooth curve for its entire length, including the edge transition region 360.

In general, the ideal edge curve on a raster image will not pass through the sampled pixels. Rather, it will pass through points lying in between adjacent pixels (see FIG. 3). The area in between an adjacent pair of pixels which is intersected by an edge curve belongs to the edge transition region. Therefore, given a specific edge curve, the corresponding edge transition region is a narrow annular region on the image plane enclosing the edge curve.

In this example, the edge transition region 360 is approximately one pixel in width, centered on edge 310 and extending approximately one half pixel in each direction. Using a regular B-spline curve, the output raster image would be subject to blurriness in the edge region due to the smooth nature of the function through the edge transition region.

In contrast, when edge enhancements are applied as described above, and the reparameterized B-spline curve 350 is used, the transition in the edge region is much sharper. The output pixels 355 that are calculated using the reparameterized B-spline curve 350 form a visual edge that is much more sharp and distinct, as indicated by the rapid change in color level at the edge location 310.

This edge sharpness is a consequence of a mapping function between the regular B-spline curve and the reparameterized B-spline curve. Points inside of the edge region 360 in the reparameterized curve map to the points immediately outside the edge region 360 in the regular B-spline curve, as shown by mapping link 330. Using this mapping, this means that points inside the edge transition region will be painted with colors of the points immediately outside but on the same side of the edge. Points outside of the edge region 360, however, map to their respective locations in the regular B-spline curve, with minimal or no change in location, as shown by mapping link 320. This ensures that points not near estimated edge locations have the same color as in the conventional bicubic B-spline interpolation, maintaining $C^2$ continuity at these locations.

In an alternative implementation, after calculating the B-spline surface for an input raster image, the input raster image is scaled to the desired size. Edges are identified on the scaled raster image, and a B-spline curve is calculated for each edge location. As the edges are already identified on the scaled raster image, it is not necessary to scale these B-spline curves. The B-spline surface is reparameterized based on the edge map. The reparameterized B-spline curve is then rendered on the output raster image.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The invention has been described in terms of particular embodiments. Other embodiments are within the scope of the following claims. For example, the steps of the invention can be performed in a different order and still achieve desirable results.

What is claimed is:

1. A computer program product, tangibly embodied in a machine-readable storage device, comprising instructions operable to cause data processing apparatus to:
  define a parametric surface interpolating an input raster image, the parametric surface being defined by a parametric equation in two parameters, parameter value pairs defining points on a surface parameter space;
  receive image edge locations in the surface parameter space; and
  use the image edge locations to reparameterize the parametric surface near the edge locations, the reparameterization including applying a mapping function to points on the surface parameter space such that one or more points within an edge transition region adjacent to the edge locations of the reparameterized parametric surface are mapped to one or more corresponding points outside the edge transition region in the surface parameter space.

2. The computer program product of claim 1, wherein:
  the surface definition satisfies the equation Color=Z(x, y), where Color is the color at point (x, y);
  $g_x(x, y, E)$ and $g_y(x, y, E)$ are reparameterization functions, E being edge information; and
  after reparameterization, the color at a point (x, y) is calculated to satisfy the equations $x' = x + g_x(x, y, E)$ $y' = y + g_y(x, y, E)$ $Color = Z(x', y')$.

3. The computer program product of claim 1, wherein the image edge locations are received with the raster image.

4. The computer program product of claim 1, wherein the image edge locations are detected in the input raster image.

5. A computer program product, tangibly embodied in a machine-readable storage device, comprising instructions operable to cause data processing apparatus to:
  receive an input raster image of input pixels (x, y), each input pixel having a color value;
  define a parametric surface interpolating the color values of the input raster image, the parametric surface being defined by a parametric equation in two parameters, parameter value pairs defining points on a surface parameter space;
  detect edges on the input raster image; and
  create an edge enhancement mapping by estimating edge locations on the surface parameter space, where the edge enhancement mapping is a non linear mapping from an image plane to the surface parameter space that does not map image plane points close to edge locations on the image plane to points close to estimated edge locations on the surface parameter space.

6. The computer program product of claim 5, wherein:
  the parametric surface is defined as a smooth function $Z(x, y)$ over a parameter plane;
  the parameter plane is the domain of parameters (x, y) and generally corresponds to the image plane;
  at a value of (x, y) corresponding to an input pixel locations, the function $Z(x, y)$ evaluates to the color value of the input pixel; and
  the nature of the correspondence between the image plane and parameter plane is modified by the edge enhancement mapping.

7. The computer program product of claim 6, wherein:
  the edge enhancement mapping is defined by scaling factors $s_x$ and $s_y$, and an edge enhancement function g according to the following equations for an output pixel at indices (p, q):

$x_s = p/s_x$ $y_s = q/s_y$ which map the output pixels to points on the input raster image, and $x' = x_s + g_x(x, y, E)$ $y' = y_s + g_y(x, y, E)$ which maps the image plane to the parameter plane using the edge enhancement functions $g_x$ and $g_y$, the functions $g_x$ and $g_y$ having values close to zero when their arguments are far from an edge location and having absolute values close to one when their arguments are close to an edge location; and
  the color of the pixel at image plane location (x, y) being the value of $Z(x', y')$.

8. The computer program product of claim 7, wherein the scaling factor $s_x$ is equal to the scaling factor $s_y$.

9. The computer program product of claim 7, wherein:
the parametric surface is a cubic B-spline surface and the parameter plane is a spline parameter plane; and
the function g is approximately $$g_x = 2\sigma_x(x-x_e)/(\sigma_x^2(x-x_e)^2+1) \text{ and}$$

$$g_y = 2\sigma_y(y-y_e)/(\sigma_y^2(y-y_e)^2+1)$$

where $x_e$ and $y_e$ are position coordinates of the edge pixel closest to the pixel (x, y), and where $\sigma_x$ and $\sigma_y$ are sharpness parameters such that a larger value of $\sigma_x$ or $\sigma_y$ indicates a higher level of sharpness at the edge positions.

10. The computer program product of claim 9, wherein the values $\sigma_x$ and $\sigma_y$ are equal to $s_x$ and $s_y$ respectively.

11. The computer program product of claim 7, wherein:
the function g is altered at regions where more than one edge positions are present.

12. The computer program product of claim 5, wherein:
instructions to estimate edge positions comprise instructions to apply a Canny edge detector to the input raster image and to apply edge thinning to every edge found by the edge detector.

13. The computer program product of claim 5, wherein:
an output raster is the same as the input raster image; and
the edge enhancement mapping is performed using an edge enhancement function g; and
the edge enhancement function g is implemented by the following approximation:

$$g_x = 2(x-x_e)/((x-x_e)^2+1) \text{ and}$$

$$g_y = 2(y-y_e)/((y-y_e)^2+1)$$

where $x_e$ and $y_e$ are position coordinates of the edge pixel closest to the pixel (x, y).

14. The computer program product of claim 1, where the reparameterization further comprises:
using the reparameterized parametric surface to render a scaled version of the raster image.

15. The computer program product of claim 1, where the reparameterization further comprises applying the mapping function to one or more points outside the edge transition region of the reparameterized parametric surface such that the one or more points are mapped to corresponding points on the surface parameter space having substantially the same locations on the surface parameter space and the reparameterized parametric surface.

16. A system comprising:
a processor and a memory operable to interact to perform operations including:
defining a parametric surface interpolating an input raster image, the parametric surface being defined by a parametric equation in two parameters, parameter value pairs defining points on a surface parameter space;
receiving image edge locations in the surface parameter space; and
using the image edge locations to reparameterize the parametric surface near the edge locations, the reparamerterization including applying a mapping function to points on the surface parameter space such that one or more points within an edge transition region adjacent to the edge locations of the reparameterized parametric surface are mapped to corresponding points edge locations of the reparameterized parametric surface are mapped to one or more corresponding points outside the edge transition region in the surface parameter space.

17. The system of claim 16, wherein:
the surface definition satisfies the equation Color=Z(x, y), where Color is the color at point (x, y);
$g_x(x, y, E)$ and $g_y(x, y, E)$ are reparameterization functions, E being edge information; and
after reparameterization, the color at a point (x, y) is calculated to satisfy the equations $$x' = x + g_x(x,y,E)$$

$$y' = y + g_y(x,y,E)$$

$$\text{Color} = Z(x',y').$$

18. The system of claim 16, wherein the image edge locations are received with the raster image.

19. The system of claim 16, wherein the image edge locations are detected in the input raster image.

20. A system, comprising:
a processor and a memory operable to interact to perform operations including:
receiving an input raster image of input pixels (x, y), each input pixel having a color value;
defining a parametric surface interpolating the color values of the input raster image, the parametric surface being defined by a parametric equation in two parameters, parameter value pairs defining points on a surface parameter space;
detecting edges on the input raster image; and
creating an edge enhancement mapping by estimating edge locations on the surface parameter space, where the edge enhancement mapping is a non linear mapping from an image plane to the surface parameter space that does not map image plane points close to edge locations on the image plane to points close to estimated edge locations on the surface parameter space.

21. The system of claim 20, wherein:
the parametric surface is defined as a smooth function Z(x, y) over a parameter plane;
the parameter plane is the domain of parameters (x, y) and generally corresponds to the image plane;
at a value of (x, y) corresponding to an input pixel locations, the function Z(x, y) evaluates to the color value of the input pixel; and
the nature of the correspondence between the image plane and parameter plane is modified by the edge enhancement mapping.

22. The system of claim 21, wherein:
the edge enhancement mapping is defined by scaling factors $s_x$ and $s_y$, and an edge enhancement function g according to the following equations for an output pixel at indices (p, q):

$$x_s = p/s_x$$

$$y_s = q/s_y$$

which map the output pixels to points on the input raster image, and $$x' = x_s + g_x(x,y,E)$$

$$y' = y_s + g_y(x,y,E)$$

which maps the image plane to the parameter plane using the edge enhancement functions $g_x$ and $g_y$, the functions $g_x$ and $g_y$ having values close to zero when their arguments are far from an edge location and having absolute values close to one when their arguments are close to an edge location; and the color of the pixel at image plane location (x, y) being the value of $Z(x',y')$.

23. The system of claim 22, wherein the scaling factor $s_x$ is equal to the scaling factor $s_y$.

24. The system of claim 22, wherein:

the parametric surface is a cubic B-spline surface and the parameter plane is a spline parameter plane; and the function g is approximately $g_x=2\sigma_x(x-x_e)/(\sigma_x^2(x-x_e)^2+1)$ and $g_y=2\sigma_y(y-y_e)/(\sigma_y^2(y-y_e)^2+1)$, where $x_e$ and $y_e$ are position coordinates of the edge pixel closest to the pixel (x, y), and where $\sigma_x$ and $\sigma_y$ are sharpness parameters such that a larger value of $\sigma_x$ or $\sigma_y$ indicates a higher level of sharpness at the edge positions.

25. The system of claim 24, wherein the values $\sigma_x$ and $\sigma_y$ are equal to $s_x$ and $s_y$, respectively.

26. The system of claim 22, wherein:

the function g is altered at regions where more than one edge positions are present.

27. The system of claim 20, wherein:

estimating edge positions comprise instructions to apply a Canny edge detector to the input raster image and to apply edge thinning to every edge found by the edge detector.

28. The system of claim 20, wherein:

an output raster is the same as the input raster image; and the edge enhancement mapping is performed using an edge enhancement function g; and the edge enhancement function g is implemented by the following approximation:

$g_x=2(x-x_e)/((x-x_e)^2+1)$ and $g_y=2(y-y_e)/((y-y_e)^2+1)$, where $x_e$ and $y_e$ are position coordinates of the edge pixel closest to the pixel (x, y).

29. The system of claim 16, where the reparameterization further comprises:

using the reparameterized parametric surface to render a scaled version of the raster image.

30. The system of claim 16, where the reparameterization further comprises applying the mapping function to one or more points outside the edge transition region of the reparameterized parametric surface such that the one or more points are mapped to corresponding points on the surface parameter space having substantially the same locations on the surface parameter space and the reparameterized parametric surface.

31. A computer-implemented method comprising:

defining a parametric surface interpolating an input raster image, the parametric surface being defined by a parametric equation in two parameters, parameter value pairs defining points on a surface parameter space;

receiving image edge locations in the surface parameter space; and using the image edge locations to reparameterize the parametric surface near the edge locations, the reparamerterization including applying a mapping function to points on the surface parameter space such that one or more points within an edge transition region adjacent to the edge locations of the reparameterized parametric surface are mapped to one or more corresponding points outside the edge transition region in the surface parameter space.

32. The computer-implemented method of claim 31, wherein:

the surface definition satisfies the equation Color=$Z(x, y)$, where Color is the color at point (x, y);

$g_x(x, y, E)$ and $g_y(x, y, E)$ are reparameterization functions, E being edge information; and after reparameterization, the color at a point (x, y) is calculated to satisfy the equations $x'=x+g_x(x,y,E)$ $y'=y+g_y(x,y,E)$ Color=$Z(x',y')$.

33. The computer-implemented method of claim 31, wherein the image edge locations are received with the raster image.

34. The computer-implemented method of claim 31, wherein the image edge locations are detected in the input raster image.

35. A computer-implemented method, comprising:

receiving an input raster image of input pixels (x, y), each input pixel having a color value;

defining a parametric surface interpolating the color values of the input raster image, the parametric surface being defined by a parametric equation in two parameters, parameter value pairs defining points on a surface parameter space;

detecting edges on the input raster image; and creating an edge enhancement mapping by estimating edge locations on the surface parameter space, where the edge enhancement mapping is a non linear mapping from an image plane to the surface parameter space that does not map image plane points close to edge locations on the image plane to points close to estimated edge locations on the surface parameter space.

36. The computer-implemented method of claim 35, wherein:

the parametric surface is defined as a smooth function $Z(x, y)$ over a parameter plane;

the parameter plane is the domain of parameters (x, y) and generally corresponds to the image plane;

at a value of (x, y) corresponding to an input pixel locations, the function $Z(x, y)$ evaluates to the color value of the input pixel; and the nature of the correspondence between the image plane and parameter plane is modified by the edge enhancement mapping.

37. The computer-implemented method of claim 36, wherein:

the edge enhancement mapping is defined by scaling factors $s_x$ and $s_y$, and an edge enhancement function g according to the following equations for an output pixel at indices (p, q):

$x_s=p/s_x$ $y_s=q/s_y$ which map the output pixels to points on the input raster image, and $x'=x_s+g_x(x,y,E)$ $y'=y_s+g_y(x,y,E)$ which maps the image plane to the parameter plane using the edge enhancement functions $g_x$ and $g_y$, the functions $g_x$ and $g_y$ having values close to zero when their arguments are far from an edge location and having absolute values close to one when their arguments are close to an edge location; and the color of the pixel at image plane location (x, y) being the value of Z(x',y').

38. The computer-implemented method of claim 37, wherein the scaling factor $s_x$ is equal to the scaling factor $s_y$.

39. The computer-implemented method of claim 37, wherein:

the parametric surface is a cubic B-spline surface and the parameter plane is a spline parameter plane; and the function g is approximately $$g_x = 2\sigma_x(x-x_e)/(\sigma_x^2(x-x_e)^2+1) \text{ and}$$

$$g_y = 2\sigma_y(y-y_e)/(\sigma_y^2(y-y_e)^2+1),$$

where $x_e$ and $y_e$ are position coordinates of the edge pixel closest to the pixel (x, y), and where $\sigma_x$ and $\sigma_y$ are sharpness parameters such that a larger value of $\sigma_x$ or $\sigma_y$ indicates a higher level of sharpness at the edge positions.

40. The computer-implemented method of claim 39, wherein the values $\sigma_x$ and $\sigma_y$ are equal to $s_x$ and $s_y$, respectively.

41. The computer-implemented method of claim 37, wherein:

the function g is altered at regions where more than one edge positions are present.

42. The computer-implemented method of claim 35, wherein:

estimating edge positions comprises applying a Canny edge detector to the input raster image and to apply edge thinning to every edge found by the edge detector.

43. The computer-implemented method of claim 35, wherein:

an output raster is the same as the input raster image; and the edge enhancement mapping is performed using an edge enhancement function g; and the edge enhancement function g is implemented by the following approximation:

$$g_x = 2(x-x_e)/((x-x_e)^2+1) \text{ and}$$

$$g_y = 2(y-y_e)/((y-y_e)^2+1),$$

where $x_e$ and $y_e$ are position coordinates of the edge pixel closest to the pixel (x, y).

44. The computer-implemented method of claim 31, further comprising:

using the reparameterized parametric surface to render a scaled version of the raster image.

45. The computer-implemented method of claim 31, where the reparameterization further comprises applying the mapping function to one or more points outside the edge transition region of the reparameterized parametric surface such that the one or more points are mapped to corresponding points on the surface parameter space having substantially the same locations on the surface parameter space and the reparameterized parametric surface.

* * * * *

UNITED STATES PATENT AND TRADEMARK OFFICE
CERTIFICATE OF CORRECTION

PATENT NO. : 7,817,871 B2  
APPLICATION NO. : 10/921628  
DATED : October 19, 2010  
INVENTOR(S) : Krish Chaudhury et al.

Page 1 of 1

It is certified that error appears in the above-identified patent and that said Letters Patent is hereby corrected as shown below:

Column 11, Lines 61-62 at Claim 16; replace:
"parametric surface near the edge locations, the
reparamerterization including applying a mapping func-" with
-- parametric surface near the edge locations, the
reparameterization including applying a mapping func- --

Column 11, Lines 65-67 at Claim 16; replace:
"adjacent to the edge locations of the reparameterized
parametric surface are mapped to corresponding
points edge locations of the reparameterized paramet-" with
-- adjacent to the edge locations of the reparameterized paramet --

Column 13, Lines 60-61, at Claim 31; replace:
"metric surface near the edge locations, the reparamerterization
including applying a mapping function to" with
-- metric surface near the edge locations, the reparameterization
 including applying a mapping function to --

Signed and Sealed this

Twenty-second Day of March, 2011

David J. Kappos
*Director of the United States Patent and Trademark Office*